(12) United States Patent
Wang et al.

(10) Patent No.: US 11,967,166 B2
(45) Date of Patent: Apr. 23, 2024

(54) METHOD AND SYSTEM FOR AUTOMATED IDENTIFICATION AND CLASSIFICATION OF MARINE LIFE

(71) Applicants: Tianye Wang, Halifax (CA); Shiwei Liu, Lehi, UT (US); Xiaoge Cheng, Beijing (CN)

(72) Inventors: Tianye Wang, Halifax (CA); Shiwei Liu, Lehi, UT (US); Xiaoge Cheng, Beijing (CN)

( * ) Notice: Subject to any disclaimer, the term of this patent is extended or adjusted under 35 U.S.C. 154(b) by 360 days.

(21) Appl. No.: 17/533,224

(22) Filed: Nov. 23, 2021

(65) Prior Publication Data

US 2022/0164570 A1     May 26, 2022

Related U.S. Application Data

(60) Provisional application No. 63/116,939, filed on Nov. 23, 2020.

(51) Int. Cl.
| | |
|---|---|
| G06V 40/10 | (2022.01) |
| G06F 18/213 | (2023.01) |
| G06F 18/241 | (2023.01) |
| G06N 3/04 | (2023.01) |
| G06T 7/11 | (2017.01) |
| G06V 10/94 | (2022.01) |

(52) U.S. Cl.
CPC ............ *G06V 40/10* (2022.01); *G06F 18/213* (2023.01); *G06F 18/241* (2023.01); *G06N 3/04* (2013.01); *G06T 7/11* (2017.01); *G06V 10/95* (2022.01); *G06T 2207/20084* (2013.01)

(58) Field of Classification Search
CPC ........ G06V 10/82; G06V 10/95; G06V 40/10; G06V 20/20; G06N 3/04; G06F 18/213; G06F 18/241; G06T 7/11; G06T 2207/20084

See application file for complete search history.

(56) References Cited

U.S. PATENT DOCUMENTS

2019/0033447 A1\*   1/2019   Chan ................. G06F 18/24133

OTHER PUBLICATIONS

Qiao, et al. (Computer English Translation of Chinese Patent No. CN108154105 B), pp. 1-17. (Year: 2020).\*
Xiao, et al. (Computer English Translation of Chinese Patent No. CN111814881A), pp. 1-9. (Year: 2020).\*

\* cited by examiner

*Primary Examiner* — Daniel G Mariam

(57) ABSTRACT

The present disclosure provides a method and system architectures for carrying out the method of automated marine life object classification and identification utilising a core of a Deep Neural Network, DNN, to facilitate the operations of a post-processing module subnetwork such as instance segmentation, masking, labelling, and image overlay of an input image determined to contain one or more target marine life objects. Multiple instances of target objects from the same image data can be easily classified and labelled for post-processing through application of a masking layer over each respective object by a semantic segmentation network.

10 Claims, 4 Drawing Sheets

| Receiving, by a Deep Neural Network (DNN) comprising a plurality of blocks of convolutional layers and activation layers, an image of an underwater environment. | 102 |

↓

| Generating, by the DNN, at least one feature map representing the image and passing the at least one feature map to a region proposal network and a classification network. | 104 |

↓

| Determining, by the region proposal network, a target object probability for each of the features of the at least one feature map and passing the probabilities for one or more of the target objects to the classification network. | 106 |

↓

| Calculating, by the region proposal network, the image coordinates for the one or more target objects and passing the image coordinates to a semantic segmentation network. | 108 |

↓

| Receiving, by the classification network, the at least one feature map and the probabilities for the one or more target objects and determining an object class and an object bounding box for each of the one or more target objects. | 110 |

↓

| Receiving, by the semantic segmentation network, the feature map and the coordinates for the one or more target objects and generating a segmentation mask for each target object. | 112 |

↓

| Receiving, by a post-processing module, the image and the object class, mask, and object bounding box for each target object and generating an overlaid image wherein each identified object is segmented and classified. | 114 |

FIG. 1

METHOD AND SYSTEM FOR AUTOMATED IDENTIFICATION AND CLASSIFICATION OF MARINE LIFE

FIELD OF INVENTION

The present invention relates generally to the field of object identification and classification in computer vision. More specifically, the present invention relates to a system and method for applying a neural network to the task of identifying and classifying marine life objects in an input image.

BACKGROUND

Detection and identification of underwater organisms has great application value in many fields such as ocean exploration, underwater monitoring, diving operations, fishing and underwater sightseeing.

The detection and recognition of underwater organisms has traditionally been based on sonar images, but with the growing capabilities of deep learning algorithms and their ability to gain large amounts of valuable data from analysing camera images without the need for specialist analysts, the use of camera devices is becoming more prevalent.

As such the need for more sophisticated deep learning algorithms and structures capable of processing the images is also becoming greater. For example, there is a need for deep learning networks that can reliably distinguish between multiple instances of target marine life objects depicted in a single image.

It is within this context that the present invention is disclosed.

SUMMARY

The present disclosure provides a method and system architectures for carrying out the method of automated marine life object classification and identification utilising a core of a Deep Neural Network, DNN, to facilitate the operations of a post-processing module subnetwork such as instance segmentation, labelling, masking, and image overlay of an input image determined to contain marine life objects. Multiple instances of target objects from the same image data can be easily classified and labelled for post-processing through application of a masking layer over each respective object by a semantic segmentation network.

By including subnetworks and, in particular, module subnetworks, in a deep neural network, the deep neural network can perform better on image processing tasks, e.g., object recognition or image classification. Additionally, deep neural networks that include module subnetworks can be trained quicker and more efficiently than deep neural networks that do not include module subnetworks while maintaining improved performance on the image processing tasks.

Thus, according to one aspect of the present disclosure there is provided a computer-implemented method of identifying and classifying marine creatures, comprising: receiving, by a Deep Neural Network (DNN) comprising a plurality of blocks of convolutional layers and activation layers, an image of an underwater environment; generating, by the DNN, at least one feature map representing the image and passing the at least one feature map to a region proposal network and a classification network; determining, by the region proposal network, a target object probability for each of the features of the at least one feature map and passing the probabilities for one or more of the target objects to the classification network; calculating, by the region proposal network, the image coordinates for the one or more target objects and passing the image coordinates to a semantic segmentation network.

The method further comprises receiving, by the classification network, the at least one feature map and the probabilities for the one or more target objects and determining an object class and an object bounding box for each of the one or more target objects; receiving, by the semantic segmentation network, the feature map and the coordinates for the one or more target objects and generating a segmentation mask for each respective target object; receiving, by a post-processing module, the image and the object class, mask, and object bounding box for each target object and generating an overlaid image wherein each identified object is segmented and classified to aid with differentiation between target objects in post-processing and labelling operations.

In some embodiments, the method further comprises applying, by a pre-processing module, pre-processing techniques to the image prior to passing the image to the DNN, the pre-processing techniques applied by the pre-processing module may comprise at least one of labelling and augmenting the image to identify and classify target objects for training purposes.

The activation layers of the DNN may be rectified linear unit (ReLu) layers and each block in the DNN may further comprises a batch normalisation (BN) layer.

In some embodiments, the step of determining a target object probability for each of the features comprises calculating, for each feature identified in the feature map, a probability that the identified feature represents a target object and determining that the feature represents a target object if the probability is equal to or greater than a threshold probability.

The step of calculating the image coordinates for each target object found may also comprise using each feature in the feature map for which a threshold probability is met as an anchor point in the feature map for generating an anchor box containing the target object.

Furthermore, the coordinates of each anchor box can be calculated using a regression algorithm.

In some embodiments, the classification network comprises one or more fully connected layers and a softmax layer for calculating the object class probabilities.

In some embodiments, the step of generating a segmentation mask for each target object comprises passing the feature map and the coordinates for the one or more target objects through first and second convolutional layers and applying a binary threshold function.

BRIEF DESCRIPTION OF THE DRAWINGS

Various embodiments of the invention are disclosed in the following detailed description and accompanying drawings.

FIG. 1 illustrates a flow chart of the core method of the present disclosure.

Figure 2:
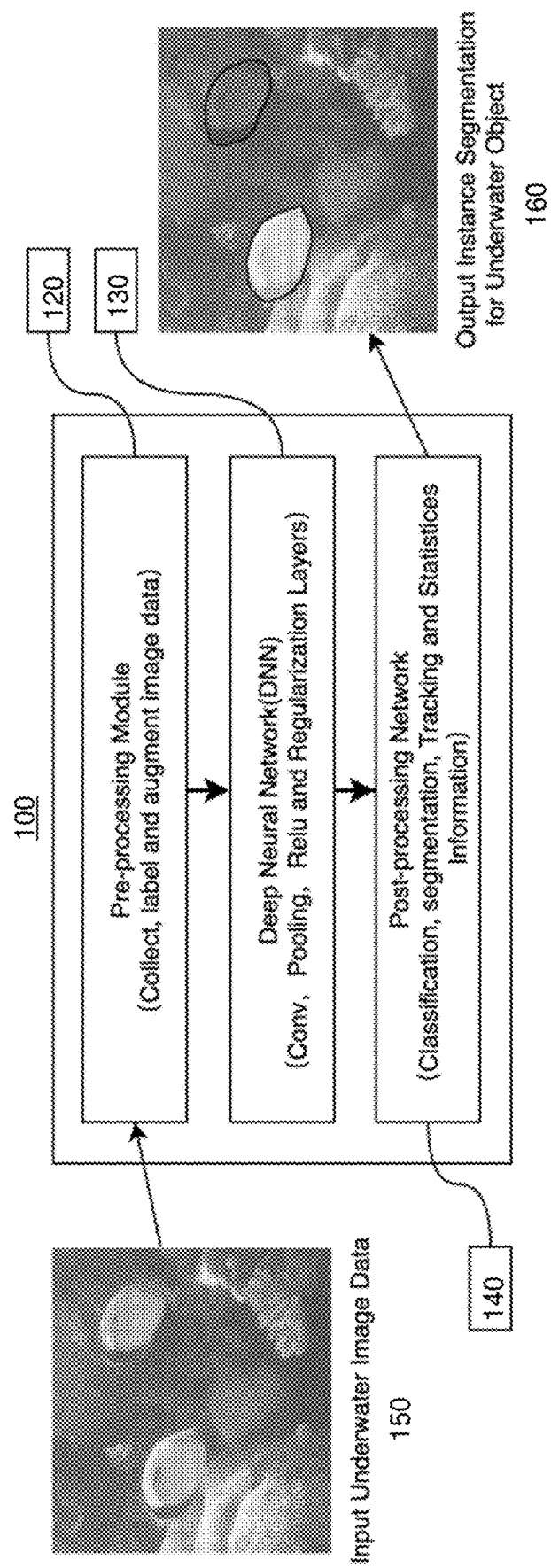
FIG. 2 illustrates a high-level example configuration of a system architecture for carrying out the method of the present disclosure.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The disclosed methods and systems for carrying out the methods combine to facilitate the classification, segmentation and tracking of underwater life from images either in real time or in retrospect.

Referring to FIG. 1, a flow chart of the various steps core method of the present disclosure is shown.

A first step 102 involves receiving an image of an underwater environment 150 by a Deep Neural Network (DNN) made up of a plurality of blocks of convolutional layers and activation layers. The activation layers of the DNN may be rectified linear unit (ReLu) layers and each block in the DNN may further comprises a batch normalisation (BN) layer.

The image data may be a two-dimensional image, a frame from a continuous video stream, a three-dimensional image, a depth image, an infrared image, a binocular image, or any suitable combination thereof. For example, an image may be received from a camera. The devices on which the DNN is running may have access to API libraries such as media libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like.

During a training stage of the DNN the received image 150 may be a labelled or augmented image with marine life objects already demarcated as will be explained below with reference to FIG. 2.

A second step 104 involves generating, by the DNN, at least one feature map representing the image and passing the at least one feature map to a region proposal network and a classification network. Generally, each block in the plurality of blocks of convolutional and activation layers will produce a distinct feature map during the training stage of the DNN, with weights of the different layers being adjusted to correct the DNN inference against the annotated training data, thus forming a set of feature maps that are used by the DNN to classify features identified in a new input image after the training stage.

A third step 106 involves determining, by the region proposal network, a target object probability for each of the features of the at least one feature map and passing the probabilities for one or more of the target objects to the classification network. For example, probabilities surpassing a certain predefined threshold may be passed to the classification network, thereby excluding all those features of the generated feature map that are unlikely to represent marine life objects.

A fourth step 108 involves calculating, by the region proposal network, the image coordinates for the one or more target objects and passing the image coordinates to a semantic segmentation network, this step is important for segmentation and overlaying operations carried out to produce a final image as the positions of the objects representing possible marine life objects on the image grid need to be identified. The coordinates may be pixel coordinates or aspect ratio agnostic coordinates to account for the resolutions of different types of input image. Each feature in the feature map for which a threshold probability is met may be used as an anchor point in the feature map for generating an anchor box containing the target object to assist with the object segmentation process performed later in the method.

A fifth step 110 involves receiving, by the classification network, the at least one feature map and the probabilities for the one or more target objects and determining an object class and an object bounding box for each of the one or more target objects. The type of marine life object and the relative size taken up by said object in the input image can thus be obtained.

A sixth step 112 involves receiving, by the semantic segmentation network, the feature map and the coordinates for the one or more target objects and generating a segmentation mask for each target object. Segmentation may be achieved by passing the feature map and the coordinates for the one or more target objects through first and second convolutional layers and applying a binary threshold function for each possible object. The process of masking may further involve edge detection, noise reduction, and other such operations, and then the generation of an object matrix for each particular object to designate the various pixels relating to that object in the input image. Achieving instance segmentation in this manner allows for multiple marine life objects to be treated separately from the same image.

Finally, a seventh step 114 involves receiving, by a post-processing module, the image and the object class, mask, and object bounding box for each target object and generating an overlaid image wherein each identified object is segmented and classified. The final image can be used to easily track the activity of marine life objects in a large set of images with relative ease, allowing for large scale biodiversity surveys, monitoring certain populations of sea creatures, etc.

Any two or more of the modules illustrated in FIG. 2 may be combined into a single machine, and the functions described herein for any single machine, database, or device may be subdivided among multiple machines, databases, or devices.

Referring to FIG. 2, a high-level example configuration of a system architecture 100 for carrying out the method of the present disclosure is shown including the pre-processing module 120 used during the training phase.

During training of the DNN, the process for implementing the methods can be broken down into three main stages carried out by distinct modules as shown in the example system architecture 100: an image pre-processing module 120 to enhance the training data image quality for the core Deep Neural Network, DNN, during the training stage; a deep learning module 130 to train the DNN to perform prediction tasks; and a post processing module 140 to visualize the results of DNN model.

Images such as input underwater image 150 are collected, labelled, and augmented to indicate the positions and classifications of the various marine life objects contained therein by the pre-processing module 120.

The dataset of pre-processed images is subsequently passed to the DNN 130. The DNN 130 is comprised, as will be explained in more detail with reference to FIG. 3, of a plurality of blocks each having a convolutional layer and an activation layer for input data inference. The labelled datasets train the weights of the various layers and produce a set of feature maps that the network can use to easily recognise/decipher objects that share similarities with the objects contained in the training data. The actual process of training convolutional layers to interpret sets of input images in computer-vision DNNs is well known to the skilled person and will not be explained in detail here. Briefly, each convolution maps a region of an image to a feature map, this is repeated many times over all possible pixel locations on the image, with higher level layers detecting higher level features through spatial pooling, an activation function such as a Rectified Linear Unit, and a batch normalization layer.

Figure 3:
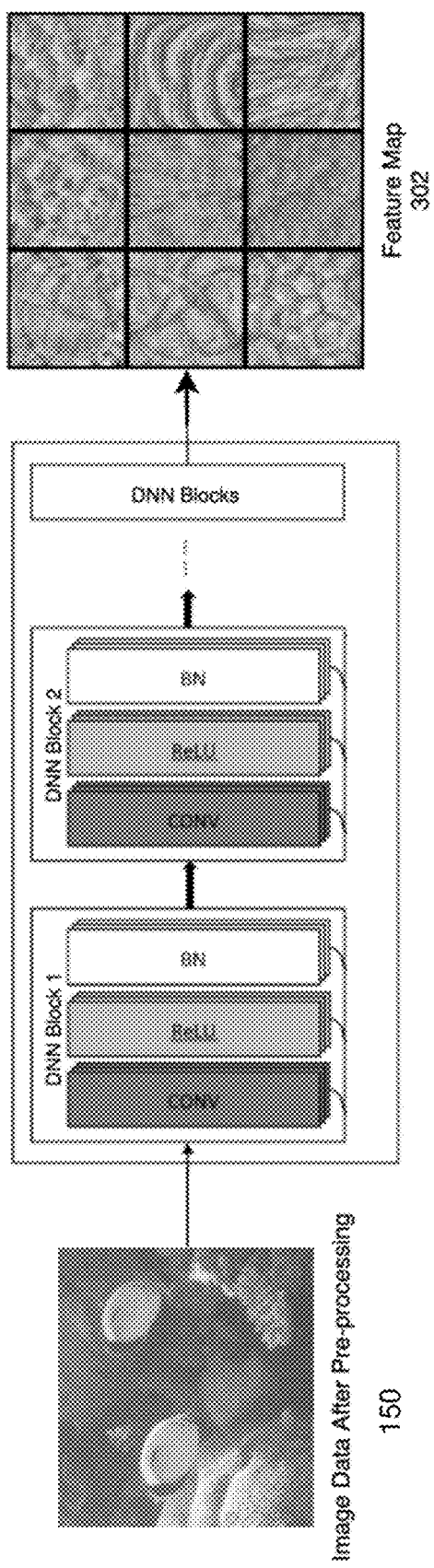
FIG. 3 illustrates a specific configuration of a system architecture for training a Deep Neural Network to carrying out the steps of the method of the present disclosure.

The basic structure of such a DNN is shown in the example of FIG. 3, wherein DNN Block 1 is the "lowest level" block, receiving the original input image and passing it first through a convolutional layer to pick out the lowest level set of features, applying a Rectified Linear Unit (ReLu) activation function and then a Batch Normalisation (BN) function. A first set of features are generated by block 1 and the output is passed to block 2 to identify a different set of features using a similar structure with different weights, and so on up the chain of DNN blocks to eventually generate a complete feature map 302. In some examples, during training the neural network will generate training loss, Intersection over Union (IoU), precision, and recall measurements for each set of training data. These measurements will be used to iteratively train and optimise the backbone DNN through the gradient descent method.

Returning to FIG. 2, the resultant feature map 302 will be passed to the post-processing module 140 to compute the class and segmentation mask of each identified marine life object in the image based on the DNN output and then combine these elements together with the original input image data 150 to generate the output image with instance segmentation as shown in image 160.

The post-processing module 140 may be further configured to aggregate statistics across multiple image sets to facilitate marine life object tracking, etc.

Figure 4:
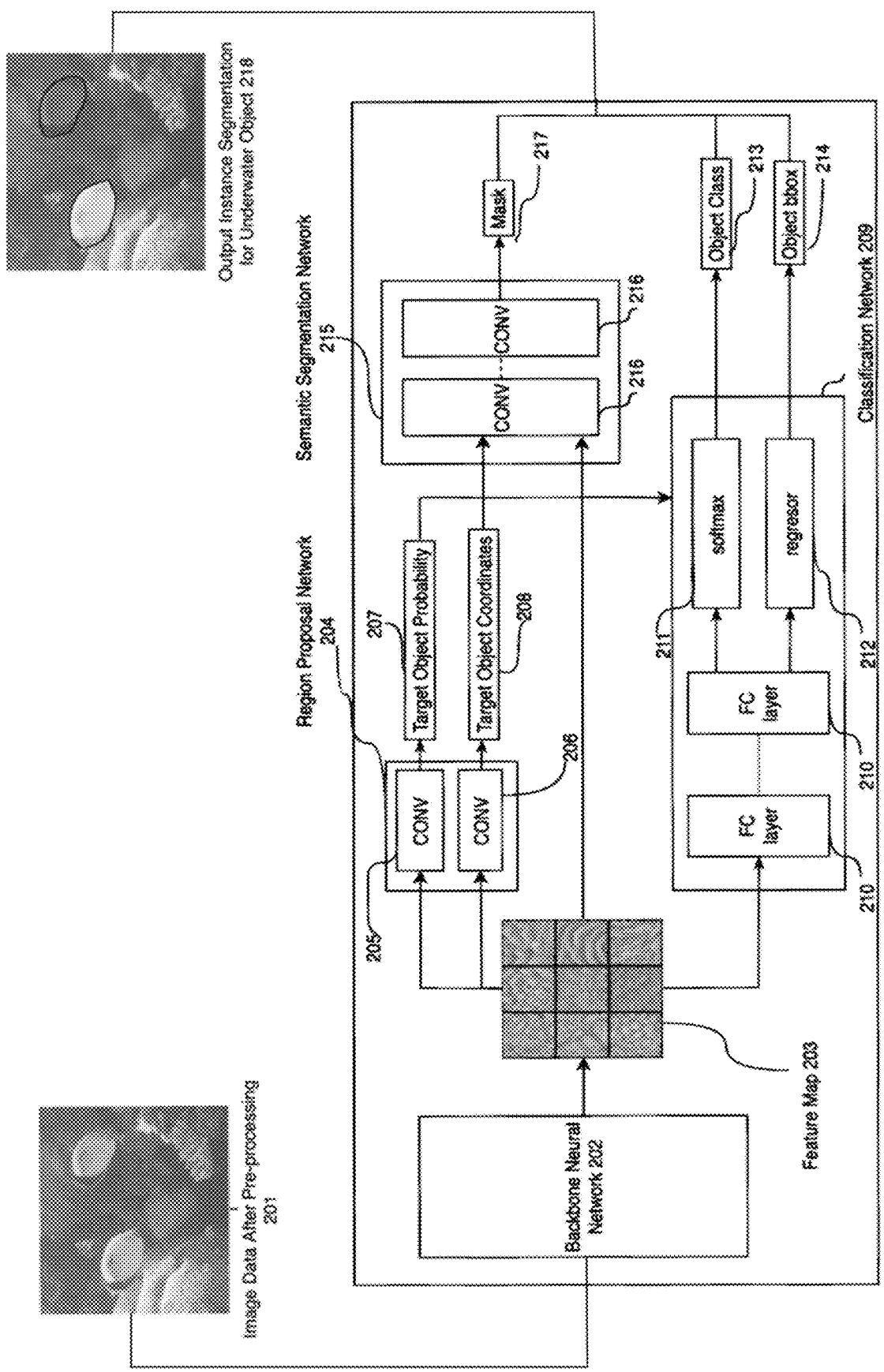
FIG. 4 illustrates a more detailed overview of a system architecture for carrying out the method of the present disclosure.

Referring to FIG. 4, a more detailed overview of a system architecture for carrying out the method of the present disclosure is shown. Here each of the network components utilised subsequent to the DNN feature map generation process are also shown, including the Region Proposal Network 204, the Semantic Segmentation Network 215, and the Classification Network 209.

The "Backbone Neural Network" 202 shown here is the DNN described in relation to FIG. 3, containing the DNN Block 311.

An example process in which the system architecture works together to identify one or more marine life objects in a pre-processed image will now be described, but the skilled person will understand that the same process could equally be applied to raw image data once the model has been trained.

Thus, in the present example, in accordance with the description above, the backbone DNN 202 receives a pre-processed image 201 and outputs a feature map 203 for the Region Proposal Network 204, Classification Network 209 and Semantic Segmentation Network 215 of the post-processing module.

The Region Proposal Network consists of a series of convolution layers 205 and 206 configured, based solely on the received feature map for the input image 201, to calculate a probability 207 that each of a plurality of identified features represent a target marine life object in the image. A set of target object coordinates 208 are also calculated for each object.

In one example, one convolution layer uses the location of each feature point in the feature map 203 as an anchor point for generating an anchor box, with the size of each anchor box depending on the dimensions and aspect ratio of the input image 201. Then, a final convolution layer will calculate the probability that each anchor box contains a target marine life object using a regression algorithm. The probability and coordinates of the anchor box for each feature point meeting a threshold probability may then be passed on as an output of the Region Proposal Network 204 to both the Classification Network 209 and the Semantic Segregation Network 215.

Specifically, the Target Object Probability 207 for each anchor box will be passed to the Classification Network 209. The Classification Network 209 consists of a series of fully connected layers, ending in a SoftMax layer 211. Convolutional neural networks generally include two kinds of neural network layers, convolutional neural network layers and fully-connected neural network layers. Convolutional neural network layers have sparse connectivity, with each node in a convolutional layer receiving input from only a subset of the nodes in the next lowest neural network layer. Some convolutional neural network layers have nodes that share weights with other nodes in the layer. Nodes in fully-connected layers, however, receive input from each node in the next lowest neural network layer.

The Softmax layer 211 uses the resultant probabilities from the fully connected layers to achieve a final class determination for each identified feature/object and generate an object class 213. The Classification Network 209 also comprises a regression layer 212 to compute the object bounding box 214 for each proposed region from the proposal network. The object class 213 and object bounding box 214 for each target object are then output from the Classification Network 209.

The Semantic Segmentation Network 215 receives both the Target Object Probability 207 and the Target Object Coordinates 208 for each anchor box from the Region Proposal Network 204 and combines this with the feature map 203 representation of the input image to apply a segmentation mask 217 to each classified object in the bounding boxes.

Segmentation is achieved by passing the feature map and the coordinates for the one or more target objects through first and second convolutional layers 216 and applying a binary threshold function for each possible object. As mentioned above, the process of masking may involve performing edge detection, noise reduction, and other such operations for each target object within the respective bounding box using the feature map 203, and then the generation of an object matrix for each object to designate the various pixels relating to that object in the input image. In one example, the weighting of the binary mask is adjusted through backpropagation of the gradient descent method and elementwise multiplication is used to compute the actual mask of objects in each bounding box.

Finally, the mask 217, object class 213, object bounding box 214 and original inference input image 201 are combined and processed together to generate the overlaid image with instance segmentation 218.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit)

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer-implemented method of identifying and classifying marine creatures, comprising:
   receiving, by a Deep Neural Network (DNN) comprising a plurality of blocks of convolutional layers and activation layers, an image of an underwater environment;
   generating, by the DNN, at least one feature map representing the image and passing the at least one feature map to a region proposal network and a classification network;
   determining, by the region proposal network, a target object probability for each of the features of the at least one feature map and passing the probabilities for one or more of the target objects to the classification network;
   calculating, by the region proposal network, the image coordinates for the one or more target objects and passing the image coordinates to a semantic segmentation network;
   receiving, by the classification network, the at least one feature map and the probabilities for the one or more target objects and determining an object class and an object bounding box for each of the one or more target objects;
   receiving, by the semantic segmentation network, the feature map and the coordinates for the one or more target objects and generating a segmentation mask for each respective target object;
   receiving, by a post-processing module, the image and the object class, mask, and object bounding box for each target object and generating an overlaid image wherein each identified object is segmented and classified to aid with differentiation between target objects in post-processing and labelling operations.

2. A computer-implemented method according to claim 1, wherein the method further comprises applying, by a pre-processing module, pre-processing techniques to the image prior to passing the image to the DNN.

3. A computer-implemented method according to claim 2, wherein the pre-processing techniques applied by the pre-processing module comprise at least one of labelling and augmenting the image to identify and classify target objects.

4. A computer-implemented method according to claim 1, wherein the activation layers of the DNN are rectified linear unit (ReLu) layers.

5. A computer-implemented method according to claim 1, wherein each block in the DNN further comprises a batch normalisation (BN) layer.

6. A computer-implemented method according to claim 1, wherein the step of determining a target object probability for each of the features comprises calculating, for each feature identified in the feature map, a probability that the identified feature represents a target object and determining that the feature represents a target object if the probability is equal to or greater than a threshold probability.

7. A computer-implemented method according to claim 6, wherein the step of calculating the image coordinates for each target object found comprises using each feature in the feature map for which a threshold probability is met as an anchor point in the feature map for generating an anchor box containing the target object.

8. A computer-implemented method according to claim 7, wherein the coordinates of each anchor box are calculated using a regression algorithm.

9. A computer-implemented method according to claim 1, wherein the classification network comprises one or more fully connected layers and a softmax layer for calculating the object class probabilities.

10. A computer-implemented method according to claim 1, wherein the step of generating a segmentation mask for each target object comprises passing the feature map and the coordinates for the one or more target objects through first and second convolutional layers and applying a binary threshold function.

* * * * *